United States Patent [19]

Ogawa et al.

[11] Patent Number: 4,687,710
[45] Date of Patent: Aug. 18, 1987

[54] MAGNETIC RECORDING MEDIUM

[75] Inventors: Hiroshi Ogawa; Shinji Saito; Chiaki Mizuno; Yasuo Tamai, all of Odawara, Japan

[73] Assignee: Fuji Photo Film Co., Ltd., Japan

[21] Appl. No.: 898,746

[22] Filed: Aug. 18, 1986

Related U.S. Application Data

[63] Continuation of Ser. No. 790,193, Oct. 22, 1985, abandoned.

[30] Foreign Application Priority Data

Oct. 23, 1984 [JP] Japan ............................ 59-222754

[51] Int. Cl.⁴ ...................... G11B 5/704; G11B 5/71
[52] U.S. Cl. ............................ 428/447; 252/62.54; 427/128; 428/694; 428/695; 428/900; 428/910
[58] Field of Search ............... 428/694, 695, 447, 900; 252/62.54; 427/131, 128; 360/134–136; 429/910

[56] References Cited

U.S. PATENT DOCUMENTS

| 4,110,503 | 8/1978 | Ogawa | 428/695 |
| 4,275,107 | 6/1981 | Bartkus | 428/220 |
| 4,369,230 | 1/1983 | Kimura | 427/131 |
| 4,436,786 | 3/1984 | Ohkawa | 428/695 |
| 4,481,231 | 11/1984 | Hashimoto | 428/900 |
| 4,497,865 | 2/1985 | Minami | 428/336 |

Primary Examiner—Ellis P. Robinson
Attorney, Agent, or Firm—Ostrolenk, Faber, Gerb & Soffen

[57] ABSTRACT

A magnetic recording medium comprising a nonmagnetic support and a magnetic recording layer provided on said support, said magnetic recording layer comprising a ferromagnetic powder dispersed in a binder, which is characterized in that said nonmagnetic support has heat shrinkage ratio of not higher than 1.0% at 110° C. for 4 hours and said magnetic recording layer comprises at least one fatty acid and at least one modified silicon compound.

14 Claims, 2 Drawing Figures

MAGNETIC RECORDING MEDIUM

This is a continuation of application Ser. No. 790,193, filed Oct. 22, 1985 and now abandoned.

BACKGROUND OF THE INVENTION

1. Field of the Invention

The present invention relates to a magnetic recording medium. More particularly, the invention relates to an improvement of a magnetic recording medium comprising a nonmagnetic support and a magnetic recording layer.

2. Description of Prior Arts

A magnetic recording medium basically comprises a nonmagnetic support and a magnetic recording layer provided on the support, the magnetic recording layer comprising a ferromagnetic powder dispersed in a binder.

At present, magnetic recording media are used in a variety of forms, for example, an audio-tape, a videotape, a floppy disk and so on. Naturally, magnetic recording media are required to have various characteristics according to their forms and purposes.

The audio-tape such as an audio cassette tape is frequently used for recording music. In this case, a magnetic recording medium is required to show excellent electromagnetic conversion characteristics such as satisfactory frequency characteristics and a superb reproducibility of original sounds. Also, a tape should have an improved running property, durability and heat resistance so as to meet the outstanding needs; since the magnetic tape-recording medium is now generally employed in automobiles, a cassette tape-recorder with radio and a small-sized tape player.

In the case of a video cassette tape, highly dense recording is now possible by shortening recording wavelengths or narrowing track width. A magnetic recording medium is, therefore, required to show excellent electromagnetic conversion characteristics such as high video outputs, high S/N ratio and excellent reproducibility of originally recorded pictures. Further, the recent widely spread use of portable VTRs need a tape having improved running property and durability. While tapes need to be highly durable, the tape thickness tends to be thinner, for example, less than 20 $\mu$m.

Thus, a magnetic recording medium in the form of tape such as a video-tape or an audio-tape should run in contact with a fixed magnetic head, a drum, guide drums and so on. Therefore, a magnetic recording medium needs to have not only excellent electromagnetic conversion characteristics but also a low friction coefficient which enables smooth and stable running for a long period of time. Further, the tape needs to have satisfactory durability and heat resistance, because it should run under a great amount of friction with a magnetic head.

There have been several proposals to fulfill the above-mentioned requirements for the characteristics of a magnetic recording medium.

For example, it is reported that the running property of a tape is improved by incorporating into the magnetic recording layer a higher fatty acid, a higher fatty acid ester, a paraffinic hydrocarbon or a silicone oil. Thus, lubrication is imparted to the tape to prevent wear of the tape caused by the friction with the tape head, thereby improving not only the tape durability but also the magnetic conversion characteristics of a magnetic recording medium. These proposals are seen in the specifications of Japanese Patent Publications No. 41(1966)-18064, No. 43(1968)186, No. 43(1968)-669, No. 47(1972)-15624, No. 56(1981)-20611 and No. 56-26890 and U.S. Pat. Nos. 2,654,681, 3,470,021, 3,497,411, 3,525,694, 3,634,253, 4,110,503, and 4,135,016.

The running property of a tape can be improved to a certain extent by incorporating a higher fatty acid, a higher fatty acid ester, a paraffinc hydrocarbon or a silicon oil into a magnetic recording layer. By these methods, however, the characteristics required for a magnetic recording medium, especially magnetic conversion characteristics, are hardly improved. There is also a problem that a magnetic recording medium using a fatty acid shows poor heat resistance and shrinks at elevated temperatures.

Japanese Patent Provisional Publication No. 59(1984)-11531 describes the use of a non-magnetic support having a low heat shrinkage ratio. However, this measure is not sufficient to improve the magnetic recording medium.

When a higher fatty acid, a higher fatty acid ester, a paraffinic hydrocarbon or a silicon oil is included in a magnetic recording layer, the phenomenon called "blooming" (the above compound oozes out from the surface of a magnetic recording layer) may sometime take place. This blooming phenomenon makes the tape sticky and consequently reduces the running smoothness. The blooming phenomenon is especially observed in the case that a silicon oil is used. Also, a tape containing the above compound may exhibit, on the contrary to the original purpose, a high coefficient of kinetic friction with a head drum under heavy load. In such instance, abnormal sounds called "creaks" are sometimes generated by the friction between the tape and the drum. Further, the compounds oozed out through blooming are very likely to catch dust, whereby the magnetic recording medium is contaminated.

SUMMARY OF THE INVENTION

It is a primary object of the present invention to provide an improved magnetic recording medium which is improved with respect to the above-described disadvantageous features of the conventional magnetic recording media.

The second object of the invention is to improve the running property of a magnetic recording medium, whereby magnetic conversion characteristics are then improved.

It is also an object of the present invention to provide a magnetic recording medium that has an improved heat stablity as well as durability, that shows little shrinkage when it is stored at high temperatures, and further that exhibits an excellent running property upon storage at high temperatures.

There is provided by the present invention a magnetic recording medium comprising a nonmagnetic support and a magnetic recording layer provided on said support, said magnetic recording layer comprising a ferromagnetic powder dispersed in a binder, which is characterized in that said nonmagnetic support has heat shrinkage ratio of not higher than 1.0% at 110° C. for 4 hours and said magnetic recording layer comprises at least one fatty acid and at least one modified silicon compound.

The magnetic recording medium provided by the invention possesses prominently improved magnetic conversion characteristics. Further, the magnetic recording medium of the present exhibits an excellent running property and satisfactory heat resistance. The present medium hardly shrinks even when it is kept at high temperatures. The physical durability is also greatly improved. Accordingly, the magnetic recording medium such as an audio-tape or a video-tape according to the invention well works even under very severe conditions.

DETAILED DESCRIPTION OF THE INVENTION

A magnetic recording medium of the invention comprises a nonmagnetic support and a magnetic recording provided on the support. The magnetic recording layer comprises a ferromagnetic powder dispersed in a binder.

The nonmagnetic support of the recording medium of the invention has a heat shrinkage ratio (which is measured along the longitudinal direction (MD) after having been kept for 4 hours at 100° C. under application of no tension) of not higher than 1.0%. If the heat shrinkage ratio of the nonmagnetic support exceeds 1.0%, the heat shrinkage ratio of the produced magnetic recording medium also tends to be high, and the deformation of the magnetic recording medium caused by heat shall hinder in some cases the sufficient improvement of the magnetic conversion characteristics and running property.

There is no specific restriction on the nonmagnetic support employable in the present invention, as far as the support fulfills the above-menioned requirement.

A material of the nonmagnetic support is not particularly limited and can be selected, for example, from polyethylene terephthalate, polypropylene, polycarbonate, polyethylene naphthalate, polyamide, polyamideimide, polyimide and metallic foils such as aluminum foil and stainless steel foil. The thickness of the support film generally is in the range of 3 to 50 μm and preferably in the range of 5 to 30 μm.

In the case of a video tape, the heat shrinkage ratio measured under the above-mentioned conditions preferably is not higher than 0.7%.

The surface roughness (Ra) of the nonmagnetic support is preferably in the range of 0.1 to 0.0001 μm, more preferably in the range of 0.05 to 0.001 μm. "Ra" is a center average roughness defined in the Section 5 of JIS-B-0601, at cut-off value of 0.25 mm. If the surface roughness exceeds 0.1 μm, the produced magnetic recording medium does not have a surface of satisfactory smoothness, and the electromagnetic conversion characteristics are not sufficiently improved in some cases. On the other hand, if the surface roughness of a support is less than 0.0001 μm, the running property is not satisfactorily improved.

The nonmagnetic support may have a back layer (or backing layer) on the opposite side of the side where a magnetic recording layer is coated.

The magnetic recording medium of the invention has the above-described nonmagnetic support coated thereupon with a magnetic recording layer comprising a ferromagnetic powder dispersed in a binder. The ferromagnetic powder employable in the present invention is not particularly restricted and can be selected from, for example, $\gamma$-$Fe_2O_3$, $Fe_3O_4$, Co-modified iron oxide, alloy powder having iron atom as a major component, modified barium ferrite and modified strontium ferrite. The shape of the ferromagnetic powder normally used is needle shape, grain shape, dice shape, rice shape or plate shape. The size of ferromagnetic powder is normally not greater than 1 μm, and preferably not greater than 0.5 μm. Its specific surface area is normally from 20 $m^2$/g to 200 $m^2$/g, preferably up to 100 $m^2$/g.

The binder employable in the present invention can be selected from any resins which are soluble in organic solvents. Examples of the resins include cellulose derivatives (e.g., nitrocellulose, cellulose acetate), vinyl chloride/vinyl acetate copolymer resins, (e.g., vinyl chloride/vinyl acetate copolymers, vinyl chloride/vinyl acetate/vinylalcohol copolymers, and vinyl chloride/vinyl acetate/maleic acid anhydride copolymers), vinylidene chloride resins (e.g., vinylidene chloride/vinyl chloride copolymers, vinylidene chloride/acrylonitrile copolymers), polyester resins (e.g., alkyd resin and linear polyester), acrylic resins (e.g., acrylic acid/acrylonitrile copolymer and methyl acrylate/acrylonitrile copolymer), polyvinyl acetal resin, polyvinyl resin, phenoxy resin, epoxy resin, butadiene/acrylonitrile copolymer resin, polyurethane resin and urethane epoxy resin. These resins can be used independently or in combination.

If the above-mentioned resin is used with polyisocyanate compound as a binder, the magnetic recording layer of the invention can be hardened to a greater degree. The polyisocyanate compounds which can be used are, for example, adducts of 3 moles of diisocyanate and 1 mole of trimethylol propane (e.g., tolylene diisocyanate, xylilene diisocyanate, hexamethylene diisocyanate), adducts of 3 moles of hexamethylene diisocyanate and buret, isocyanurate compounds of 5 moles of tolylene diisocyanate, isocyanurate adducts of 3 moles of tolylene diisocyanate and 2 moles of hexamethylene diisocyanate and polymer compounds of diphenylmethane diisocyanate.

The amount of the binder is generally in the range of 10 to 100 parts by weight and preferably in the range of 15 to 50 parts by weight per each 100 parts by weight of the ferromagnetic powder.

It is necessary to include in the magnetic recording layer of the recording medium of the invention at least one fatty acid and at least one modified silicon compound.

The amounts of the fatty acid and the modified silicon compound to be incorporated into the magnetic recording layer are not particularly limited. However, the total amount of these two kinds of compounds is generally in the range of 0.5 to 10 parts by weight, more preferably in the range of 1 to 5 parts by weight per each 100 parts by weight of the ferromagnetic powder. If the amount is less than 0.5 parts by weight, the electromagnetic characteristics and running property of the magnetic recording medium may be not sufficiently improved in some cases. If the amount exceeds 10 parts by weight, the softening of the magnetic recording layer or the blooming of the modified silicon compound may be caused, and the durability of the magnetic recording medium provided is weakened.

The magnetic recording layer generally contains the fatty acid and the modified silicon compound in a weight ratio of 9/1 to 1/9, preferably in a weight ratio of 7/3 to 3/7.

The fatty acid contributes mainly to the improvement of the running property under the ordinary running conditions. The modified silicon compound contributes mainly to the improvement of the running property after the tape is stored at high temperatures. In this manner, the running properties and heat stabilities are both improved by the incorporation of the fatty acid and the modified silicon compound in a magnetic recording layer. Further, the electromagnetic conversion characteristics of the magnetic recording medium are greatly improved.

If the magnetic recording layer includes only the fatty acid, the magnetic recording medium does not show satisfactory heat stability and shows poor electromagnetic conversion characteristics especially under the circumstances of high temperature and high humidity and after the tape has been stored at high temperatures. On the other hand, if the magnetic recording layer includes only the modified silicon compound, the magnetic recording medium does not show satisfactory running property and electromagnetic conversion characteristics, and further the magnetic recording medium lacks sufficient lubricity and shows poor durability.

The chemical structure of the modified silicon compounds employable in the present invention is not particularly limited. The modified silicon compounds can be selected from those having following chemical structures.

Modified silicon compound disclosed in Japanese Patent Publication No. 56-20611 (U.S. Pat. No. 4,110,503) having the formula (1):

(1)

wherein each of R and $R^1$ represents a hydrocarbon group having 7 to 21 carbon atoms, and n stands for an integer of 0 to 50;

Modified silicon compound disclosed in Japanese Patent Publication No. 56-26890 (U.S. Pat. No. 4,135,016) having the formula (2):

(2)

wherein each of R, $R^1$ and $R^2$ represents a hydrocarbon group having 7 to 21 carbon atoms, m is an integer of 1 to 100 and n is an interger 0 to 250 having the relationship of $m+n \leq 300$ and $m \geq n/5$;

Modified silicon compound disclosed in Japanese Patent Publication No. 52-24806 having the formula (3):

(3)

wherein each of R and $R^1$ represents either H or a hydrocarbon group having 1 to 18 carbon atoms, and each of $R^2$ and $R^3$ represents a hydrocarbon group having 2 to 17 carbons atoms;

Modified silicon compound disclosed in Japanese Patent Publication No. 52-39423 (U.S. Pat. No. 4,007,314) having the formula (4):

$$(RCOO)_n Si(CH_3)_{4-n} \quad (4)$$

wherein R represents a hydrocarbon group having 7 to 17 carbon atomss, and n is an integer of 1 to 3;

Modified silicon compound disclosed in Japanese Patent Publication No. 52-39424 (U.S. Pat. No. 4,007,313) having the formula (5):

(5)

wherein R represents a hydrocarbon group having 7 to 17 carbon atoms, and n is an interger of 1 to 3;

Modified silicon compound disclosed in Japanese Patent Publication No. 52-28687 having the formula (6):

(6)

wherein each of R and $R^1$ represents either an alkyl group or an alkenyl group having 8 to 18 carbon atoms, $R^2$ represents either a hydrogen atom or a methyl group, and n, $m_1$ and $m_2$ have the relationships of $1 \leq n \leq 15$ and $2 \leq m_1 + m_2 \leq 16$;

Modified silicon compound disclosed in Japanese Patent Publication No. 53-10446 having the formula (7):

(7)

wherein R represents a hydrocarbon group 1 to 6 carbon atomss, $R^1$ represents a hydrocarbon group having 1 to 6 carbon atoms or OH when $m_2$ and $m_3$ are both zero, $R^2$ represents a hydrocarbon having 1 to 7 carbon atoms, $R^3$ represents either a hydrogen atom or a hydrocarbon group having 1 or 2 carbon atoms, m is an integer of 1 to 40, $m_1$ is 0 or 1, $m_2$ is an integer of 0 to 20, $m_3$ is 0 or 1, and x and y are numbers which makes the sum of x and y the number in the range of 3 to 40;

Modified silicon compound having the formula (8):

(8)

wherein R represents either a hydrogen atom or a hydrocarbon group having 1 or 2 carbon atoms, $R^1$ represents a hydrocarbon group having 1 to 7 carbon atoms, x is an integer of 1 to 50, y is an integer of 1 to 30, z is an integer of 0 to 24, m is an integer of 0 to 3, $m_1$ is either 0 or 1, and $m_2$ and $m_3$ have the relationship that their sum, $m_2+m_3$, is in the range of 3 to 30;

Modified silicon compound disclosed in Japanese Patent Publication No. 57-12414 having the formula (9):

(9)

wherein each of R, $R^1$ and $R^2$ represents saturated or unsaturated hydrocarbon group having 7 to 21 carbon atoms, and x, y and z have the relationship of $1 \leq z < 150$, $0 \leq y$, $y+z \leq 1,000$, $1 \leq x < y+z$, and $z/y = 1/1000 - 1/1$;

Modified silicon compound disclosed in Japanese Patent Publication No. 57-12419 having the formula (10):

(10)

wherein each of R, $R^1$ and $R^2$ represents a hydrocarbon group having 1 to 21 carbon atoms, and n is an integer of 0 to 1,000; and Modified silicon compound disclosed in Japanese Patent Publication No. 57-12420 having the formula (11):

(11)

wherein R represents either a saturated or unsaturated hydrocarbon having 7 to 21 carbon atoms, and x and y have the relationship of $1 < x < 150$, $0 \leq y$, $x + y \leq 1,000$, $x/y = 1/1000 - 1/1$.

The modified silicon compound used in the present invention can also be selected from those disclosed in Japanese Patent Publications No. 57-12417, No. 57-37724, No. 57-37725, No. 57-37726, No. 57-37727, No. 57-37728, No. 57-37729, No. 57-37730, No. 57-37731, No. 57-37732, No. 57-37733, No. 57-37734, No. 57-37735, No. 57-37736, No. 57-40748, No. 57-40749, No. 57-40750, No. 57-40751, No. 57-40752, No. 57-40753, No. 57-40754, No. 57-71521, No. 57-71522, No. 57-71523, No. 57-71524, No. 57-71527, No. 57-92427, No. 57-92428, No. 57-92429, No. 57-92430, No. 57-92431, No. 57-92432, No. 59-22227, No. 59-22228 and No. 59-22229.

The modifying agent employed to modify a silicon compound is not particularly restricted. The modifying agent can be selected from, for example, fatty acids, alcohols, amines and fluorohydrocarbons.

As the modified silicon compound which is used in the present invention, a fatty acid modified silicon compound is preferred, and especially the fatty acid-modified silicon compound having been modified by a fatty acid possessing 12 to 22 carbon atoms are preferred. Especially, the fatty acid-modified silicon compounds expressed by the above formulae (2), (9) and (10) are preferred.

The silicon compound employed in the present invention generally a molecular weight of not less than 200, preferably not less than 1,000. The silicon compound more preferably has a molecular weight of not less than 3,000, and most preferably in the range of 5,000 to 100,000, from the viewpoint of specifically heat-resistance. However, certain silicon compounds having a molecular weight of less than 3,000 may show an excellent heat resistance.

Other than the above-mentioned ferromagnetic powder, binder, fatty acid and modified silicon compound, the magnetic recording layer of the invention may contain additives such as a dispersing agent, a lubricant, a stabilizer, an abrasive and an antistatic agent.

The dispersing agent employable in the invention is, for example, a fatty acid having 12 to 22 carbon atoms (e.g., caprylic acid, capric acid, lauric acid, myristic acid, palmitic acid, stearic acid, oleic acid, elaidic acid, linoleic acid, linolenic acid; a soap of an alkali metal (e.g., lithium, sodium or potassium) or an alkaline earth metal (e.g., magnesium, calcium or barium) of the above-mentioned fatty acid; a fatty acid amide derived from the above-mentioned fatty acid, an aliphatic amine, a higher alcohol, a polyalkyleneoxide alkylphosphate ester, an alkylphosphate ester, an alkylborate ester, a sarcosinate, an alkyl ether esters, or other known disperser or surfactant such as a trialkylpolyolefin quaternary ammonium salt and lecithin.

The lubricant employable in the invention is, for example, a fatty acid, a higher alcohol, a fatty acid ester of a monovalent fatty acid having 12 to 20 carbon atoms and a mono/polyhydric alcohol having 3 to 20 carbon atoms (e.g., butyl stearate or solbitan oleate); a mineral oil, a animal or vegetable oil, an olefin polymer having a low molecular weight, an α-olefin polymer having low molecular weight, or other known lubricant, for instance, for plastics (e.g., graphite powder, molybdenum disulfide powder or teflon powder).

The abrasive employable in the invention is, for example, α-almina, silicon carbide, chromium oxide, corundum, artificial corundum, diamond, artificial diamond, α-Fe$_2$O$_3$, garnet and emery (major components: corundum and magnetite). The average particle diameter of the abrasive is generally in the range of 0.01 to 2 μm and more preferably in the range of 0.1 to 1 μm.

The antistatic agent employable in the invention is, for example, carbon black, a natural surfactant (e.g., saponin), a nonionic surfactant (e.g., of alkylenoxide type, of glycerol type, or of glycidol type), a cationic surfactant (e.g., higher alkylamine, quarternary ammonium salt, heterocyclic phosphonium compound such as pyridine or sulfonium compounds), an anionic surfactant (e.g., carboxylic acid, sulfonic acid, phosphate or compound having acid groups such as sulfuric ester-type or phosphoric ester type), and an amphoteric surfactant (e.g., amino acid, amino sulfonic acid, sulfuric or phosphoric ester of amino alcohol).

The magnetic recording medium of the present invention can be produced by a process comprising the steps of first by preparing a magnetic paint (or dispersion) containing the ferromagnetic powder, binder, fatty acid, modified silicon compound and optional additives such as dispersing agent, lubricant, stabilizer, abrasive and antistatic agent in an organic solvent such as methyl ethyl ketone, or cyclohexane, then applying this magnetic paint onto a nonmagnetic support upon which the magnetic paint is processed to dryness. Generally, a magnetic recording layer is formed by applying the magnetic paint directly on a nonmagnetic support, but it is also possible to provide an adhesive layer or a subbing layer between the magnetic paint layer and the nonmagnetic support.

The details of the ferromagnetic powder, additives, organic solvents and the method of dispersing have been disclosed in Japanese Patent Provisional Publications No. 52-108 (U.S. Pat. No. 4,135,016), No. 52-804, No. 54-21805 and No. 54-46011. The magnetic recording medium of the present invention can also be prepared by following the procedure reported in the above publications.

The examples and the comparison examples of the present invention are given below. In the following examples, the expression "parts" means "parts by weight", otherwise specified.

The modified silicon compounds which were used in the examples and the comparison examples are as follows:

Compound number [1-1], molecular weight 578 wherein R and R$^1$ each represents C$_{13}$H$_{27}$;

Compound number [1-2], molecular weight 1,278 wherein each of R and R$^1$ represents C$_{13}$H$_{27}$, and n stands for 10;

Compound number [2-1], molecular weight 1,022 wherein each of R, R$^1$ and R$^2$ represents C$_{17}$H$_{33}$;

Compound number [2-2], molecular weight 5,446 wherein each of R, R$^1$ and R$^2$ represents C$_{17}$H$_{33}$, m is 10, 5 and n is 20;

Compound number [2-3], molecular weight 14,336 wherein each of R, R$^1$ and R$^2$ represents C$_{17}$H$_{33}$, m is 25, and n is 75;

Compound number [2-4], molecular weight 48,286 wherein each of R, R¹ and R² represents $C_{17}H_{33}$, m is 100, and n is 200;

Compound number [6-1], molecular weight 1,637 wherein each of R and R¹ represents $C_{18}H_{37}$, n is 12, and $m_1$ and $m_2$ are both 6;

Compound number [7-1], molecular weight 1,924 wherein each of m, $m_2$ and x stands for 10,

Compound number [9-1], molecular weight 1,092 wherein each of R, R¹ and R² represents $C_{17}H_{33}$;

Compound number [9-2], molecular weight 16,023 wherein each of R, R¹ and R² represents $C_{17}H_{33}$, y is 75, and z is 25;

Compound number [10-2], molecular weight 834 wherein each of R and R³ represents $C_4H_9$, and each of R¹ and R² represents $C_{17}H_{34}$ and n represents 1;

Compound number [11-1], molecular weight 13,804 wherein R represents $C_{17}H_{33}$, x is 25, and y is 75.

The compounds and their molecular weights given above are the major components and molecular weights of the modified silicon compounds.

EXAMPLES 1-8

The magnetic paint was prepared by the process comprising the steps of dispersely mixing the components indicated below for 3 minutes using a batch-type sand grinder to yield a paste, and filtering the resultant mixture using a filter having an average pore diameter of 1 μm.

| | |
|---|---|
| Y - $Fe_2O_3$ (Hc: 390 Oe, average particle length: 0.3 μm, specific surface area: 25 m²/g) | 100 parts |
| Vinyl chloride/vinyl acetate/vinyl alcohol copolymer (copolymerization ratio = 92:3:5, degree of polymerization: 400) | 20 parts |
| Polyester polyurethane (molecular weight: about 50,000) | 5 parts |
| Conductive carbon (particle size: 10 mμ) | 1 part |
| Methyl ethyl ketone | 150 parts |
| Cyclohexanone | 50 parts |
| Compound number [2-3] | indicated in Table 1 |
| Lauric acid | indicated in Table 1 |

The magnetic paint was coated on a polyethylene terephthalate film having thickness of 7 μm (the shrinkage ratio is 1.0%, and Ra is 0.02 μm upon storing at 110° C. for 4 hours), so that the resultant layer after drying would have thickness of 5 μm. While the layer was wet, the layer was treated with an electromagnet of 1,000 gauss to impart a magnetic orientation. After drying, the magnetic recording layer was subjected to super-calendering at 80° C. and 300 kg/cm² so as to make the surface of the layer smooth. The produced sheet was then slit into a tape having width of 3.81 mm and incorporated in a heat-resistant cassette half. Thus, a Phillips compact cassette tape was provided.

Each magnetic recording layer of a cassette tape prepared in Examples 1 to 4 included an equal amount of each of lauric acid (referred to as L-A in the following Tables) and the modified silicon compound of Compound number [2-3] having a molecular weight of 14,436; The total amounts of lauric acid and the modified silicon compound were different in the examples. Each magnetic recording layer of the cassette tape prepared in Examples 5 to 8 contains an equal total amount (4 parts by weight) of lauric acid and the modified silicon compound of Compound number [2-3] per 100 parts by weight of the ferromagnetic powder; The ratios between lauric acid and the modified silicon compound in the layer were different in examples.

The cassette tapes showed output levels (M315) at 315 Hz and 3% distortion, saturated output levels (S10K) at 10 KHz, tape running properties, stain and creaking set forth in Table 1. Also set forth in Table 1 in parenthesis are the tape running properties, stain and creaking of cassette tapes after the tapes were played under the tension of 40 g/cm and stored at 110° C. for 4 hours. Set forth also in Table 1 are the heat shrinkage ratios (%) in percentage along the longitudinal direction of a tape under the above-mentioned conditions.

COMPARISON EXAMPLES 1–3

Comparison Example 1

A cassette tape was produced following essentially the same procedure of Example 1 except that lauric acid and the modified silicon compound were not included.

Comparison Example 2

A cassette tape was produced following essentially the same procedure of Example 1 except that 4 parts by weight of lauric acid was used per 100 parts by weight of the ferromagnetic powder.

Comparison Example 3

A cassette tape was produced following essentially the same procedure of Example 1 except that 4 parts by weight of the modified silicon compound of Compound number [2-3] alone was used per 100 parts by weight of the ferromagnetic powder.

The cassette tapes showed output levels (M315) at 315 Hz and 3% distortion, saturated output levels (S10K) at 10 KHz, tape running properties, stain and creaking set forth in Table 1. Also set forth in Table 1 in parenthesis are the tape running properties, stain and creaking of cassette tapes after the tapes were played under the tension of 40 g/cm and stored at 110° C. for 4 hours. Set forth also in Table 1 are the heat shrinkage ratios (%) in percentage along the longitudinal direction of a tape under the above-mentioned conditions.

The tape running properties were evaluated by the running test using 50 commercial cassette players under the conditions of 60% RH at 25° C. and also by the running test using 100 commercial cassette players under the conditions of 80% RH at 40° C. The results of the evaluation are classified into the following.

A: running stopped for not more than 1 roll, no disorder in winding is found;
B: running stopped for not more than 1 roll, disorder in winding is found;
C: running stopped for 2 to 3 rolls, disorder in winding is found;
D: running stopped for 4 to 5 rolls, disorder in winding is found; and
E: running stopped for 6 or more 6 rolls, disorder in winding is found.

After the running tests, the stain on the magnetic head of the cassette deck was observed. The results are classified into the following.

A: practically no stain is noted;
B: a little stain causing no practical trouble is noted;
C: some stain is noted;
D: much stain is noted; and
E: excessive stain is noted.

The creaky sounds observed during the tape running are classified into the following.

The number of rolls at which the creaky sound is observed is as follows:

A: none, B: 1 roll, C: 2 to 3 rolls, D: 4 to 5 rolls, and E: 6 or more rolls.

EXAMPLES 9–11

Cassette tapes were produced following essentially the same procedure of Example 1 except that the amount of the modified silicon compound [2-3] was changed to 2 parts and lauric acid was changed to the following fatty acid in the amount given below.

Example 9: myristic acid
Example 10: stearic acid
Example 11: oleic acid

The cassette tapes showed the output levels (M315) at 315 Hz at 3% distortion, saturated output levels (S10K) at 10 KHz, tape running properties, stain and creaking set forth in Table 2. Also set forth in Table 2 in parenthesis are the tape running properties, stain and creaking of cassette tapes after the tapes were played under the tension of 40 g/cm and stored at 110° C. for 4 hours. Set forth also in Table 2 are the heat shrinkage ratios (%) in

TABLE 1

| | [L-A] part | [2-3] part | M315 (dB) | S10K (dB) | tape running property | stain | creak sound | heat shrinkage ratio (%) |
|---|---|---|---|---|---|---|---|---|
| Example | | | | | | | | |
| 1 | 0.5 | 0.5 | 0.2 | 0.7 | A(B) | A(A) | A(A) | 0.4 |
| 2 | 1.0 | 1.0 | 0.5 | 1.2 | A(A) | A(A) | A(A) | 0.4 |
| 3 | 2.0 | 2.0 | 0.9 | 1.5 | A(A) | A(A) | A(A) | 0.3 |
| 4 | 3.0 | 3.0 | 1.0 | 1.7 | A(A) | B(B) | A(B) | 0.3 |
| 5 | 0.5 | 3.5 | 0.5 | 1.4 | A(A) | A(A) | A(A) | 0.3 |
| 6 | 1.0 | 3.0 | 0.8 | 1.5 | A(A) | A(A) | A(A) | 0.3 |
| 7 | 3.0 | 1.0 | 0.8 | 1.5 | A(A) | A(A) | A(A) | 0.3 |
| 8 | 3.5 | 0.5 | 0.6 | 1.1 | A(A) | A(A) | A(A) | 0.4 |
| Comparison Example | | | | | | | | |
| 1 | — | — | −3.0 | −0.6 | E(E) | B(C) | E(E) | 0.9 |
| 2 | 4.0 | — | 0.4 | 0.3 | A(E) | A(B) | B(C) | 0.7 |
| 3 | — | 4.0 | −0.5 | 0.9 | B(B) | A(A) | A(B) | 0.4 |

Notes:
The values listed for M315 (output levels at 3% distortion ratio at 315 Hz) and S10K (saturated output levels at 10 KHz) are relative values based on the output level of FR1-C-60 (product of Fuji Photo Film Co., Ltd.,) taken as 0 dB (measuring device: ZX-9 produced by Nakamichi Co., Ltd.).

percentage along the longitudinal direction of a tape under the above-mentioned conditions.

TABLE 2

|  | M315 (dB) | S10K (dB) | tape running property | stain | creak sound | heat shrinkage ratio (%) |
|---|---|---|---|---|---|---|
| Example |  |  |  |  |  |  |
| 9 | 0.9 | 1.6 | A(A) | A(A) | A(A) | 0.3 |
| 10 | 0.7 | 1.4 | A(A) | A(A) | A(A) | 0.3 |
| 11 | 0.9 | 1.8 | A(A) | A(A) | A(A) | 0.3 |

Note:
Tests and evaluations were performed in the same manner as the one for Table 1, and the same representation as in Table 1 were used.

EXAMPLES 12-22

Cassette tapes were produced following essentially the same procedure of Example 1 except that lauric acid was changed to myristic acid (2 parts) and the kind and amount of the modified silicon compound was as indicated below:

| Example 12: | Compound No. | [1-1] | 2 parts |
| Example 13: |  | [1-2] | 2 parts |
| Example 14: |  | [2-1] | 2 parts |
| Example 15: |  | [2-2] | 2 parts |
| Example 16: |  | [2-4] | 2 parts |
| Example 17: |  | [6-1] | 2 parts |
| Example 18: |  | [7-1] | 2 parts |
| Example 19: |  | [9-1] | 2 parts |
| Example 20: |  | [9-2] | 2 parts |
| Example 21: |  | [10-1] | 2 parts |
| Example 22: |  | [1-1], [2-3] | 1 part each |

The cassette tapes provided showed the output levels (M315) at 315 Hz at 3% distortion, saturated output levels (S10K) at 10 KHz, tape running properties, stain and creaking set forth in Table 3. Also set forth in Table 3 in parenthesis are the tape running properties, stain and creaking of cassette tapes after the tapes were played under the tension of 40 g/cm and stored at 110° C. for 4 hours. Set forth also in Table 3 are the heat shrinkage ratios (%) in percentage along the longitudinal direction of a tape under the above-mentioned conditions.

TABLE 3

|  | M315 (dB) | S10K (dB) | tape running property | stain | creak sound | heat shrinkage ratio (%) |
|---|---|---|---|---|---|---|
| Example |  |  |  |  |  |  |
| 12 | 0.9 | 1.9 | A(B) | A(A) | A(B) | 0.5 |
| 13 | 0.8 | 1.7 | A(B) | A(A) | A(A) | 0.4 |
| 14 | 0.9 | 1.6 | A(B) | A(A) | A(A) | 0.4 |
| 15 | 0.8 | 1.6 | A(A) | B(A) | A(A) | 0.3 |
| 16 | 0.7 | 1.8 | A(A) | B(A) | A(A) | 0.3 |
| 17 | 0.8 | 1.7 | A(B) | A(B) | A(B) | 0.4 |
| 18 | 0.7 | 1.8 | A(B) | A(A) | A(B) | 0.4 |
| 19 | 0.9 | 1.8 | A(B) | A(A) | A(A) | 0.5 |
| 20 | 0.9 | 1.6 | A(A) | A(A) | A(A) | 0.3 |
| 21 | 0.8 | 1.4 | A(A) | A(A) | A(A) | 0.3 |
| 22 | 0.8 | 1.6 | A(A) | A(A) | A(A) | 0.3 |

Note:
Tests and evaluations were performed in the same manner as the one for Table 1, and the same representation as in Table 1 were used.

COMPARISON EXAMPLES 4-15

Cassete tapes were produced following essentially the same procedure of Example 1 except that the kinds of fatty acid and/or modified silicon compound were changed to those indicated below and their amounts to 4 parts.

The comparison examples using a fatty acid but not using a modified silicon compound:
Comparison Example 4: myristic acid
Comparison Example 5: oleic acid The comparison examples using a modified silicon compound but not using a fatty acid:
Comparison Example 6: Compound number [1-1]
Comparison Example 7: Compound number [1-2]
Comparison Example 8: Compound number [2-1]
Comparison Example 9: Compound number [2-2]
Comparison Example 10: Compound number [2-4]
Comparison Example 11: Compound number [6-1]
Comparison Example 12: Compound number [7-1]
Comparison Example 13: Compound number [9-1]
Comparison Example 14: Compound number [10-1]
Comparison Example 15: Compound number [11-1]

The cassete tapes showed the output levels (M315) at 315 Hz at 3% distortion, saturated output levels (S10K) at 10 KHz, tape running properties, stain and creaking set forth in Table 3. Also set forth in Table 3 in parenthesis are the tape running properties, stain and creaking of cassette tapes after the tapes were played under the tension of 40 g/cm and stored at 110° C. for 4 hours. Set forth also in Table 3 are the heat shrinkage ratios in percentage along the longitudinal direction of teh tape under the above-mentioned conditions.

TABLE 4

|  | M315 (dB) | S10K (dB) | tape running property | stain | creak sound | heat shrinkage ratio (%) |
|---|---|---|---|---|---|---|
| Comparison Example |  |  |  |  |  |  |
| 4 | 0.6 | 0.2 | A(E) | A(B) | A(C) | 0.7 |
| 5 | 0.7 | 0.3 | A(E) | A(B) | A(C) | 0.8 |
| 6 | 0.4 | 0.3 | A(C) | A(A) | B(B) | 0.5 |
| 7 | 0.3 | 0.4 | A(C) | A(A) | B(B) | 0.5 |
| 8 | 0.4 | 0.3 | A(C) | A(A) | B(B) | 0.5 |
| 9 | −0.4 | 0.7 | B(C) | A(A) | B(B) | 0.4 |
| 10 | −0.6 | 0.8 | B(B) | A(A) | B(B) | 0.4 |
| 11 | 0.1 | 0.3 | B(C) | B(B) | A(C) | 0.6 |
| 12 | −0.4 | 0.2 | B(B) | B(B) | B(B) | 0.5 |
| 13 | 0.2 | 0.2 | A(B) | A(A) | A(B) | 0.5 |
| 14 | −0.6 | 0.7 | B(B) | A(A) | A(B) | 0.4 |
| 15 | −0.7 | 0.7 | B(B) | A(A) | A(B) | 0.4 |

Note:
Tests and evaluations were performed in the same manner as the one for Table 1, and the same representation as in Table 1 were used.

The output level (M315) at 315 Hz at the distortion ratio of 3% and the saturated output level (S10K) at 10 KHz listed in Table 1 indicate the improved electromagnetic conversion charateristics of the recording tape according to the present invention. The electromagnetic conversion characteristics and other properties (such as heat resistance, stain, creaking) of the medium of the present invention are better than those of the recording tape containing neither a fatty acid nor a modified silicon compounds (Comparison Example 1) and better than those of a recording tape containing a fatty acid but containing no modified silicon compound (Comparison Example 2) or those of a recording tape containing a modified silicon compound but containing no fatty acid (Comparison Example 3).

In the magnetic recording medium of the invention, the blooming of modified silicon compound does not occur, whereby the collection of stain on the recording medium is reduced, and the magnetic head is kept clean.

Figure 1:
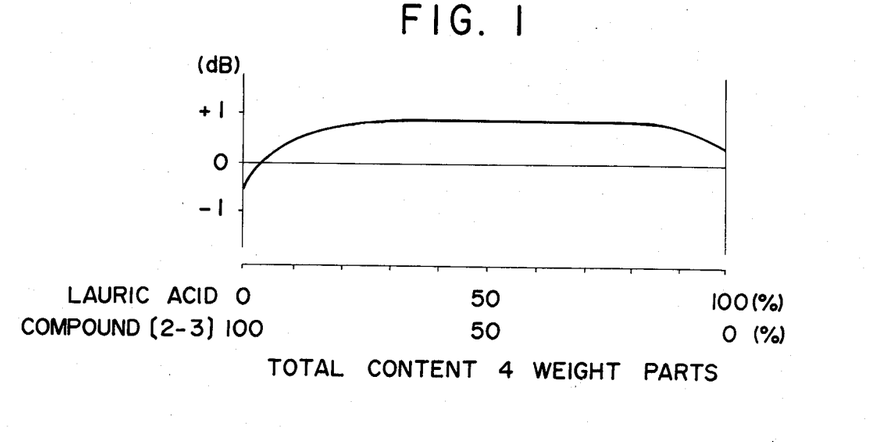
FIG. 1 is a graph showing an example of the characteristic of the output level of the magnetic recording medium of the invention at the distortion rate of 3% at 315 Hz.
Figure 2:
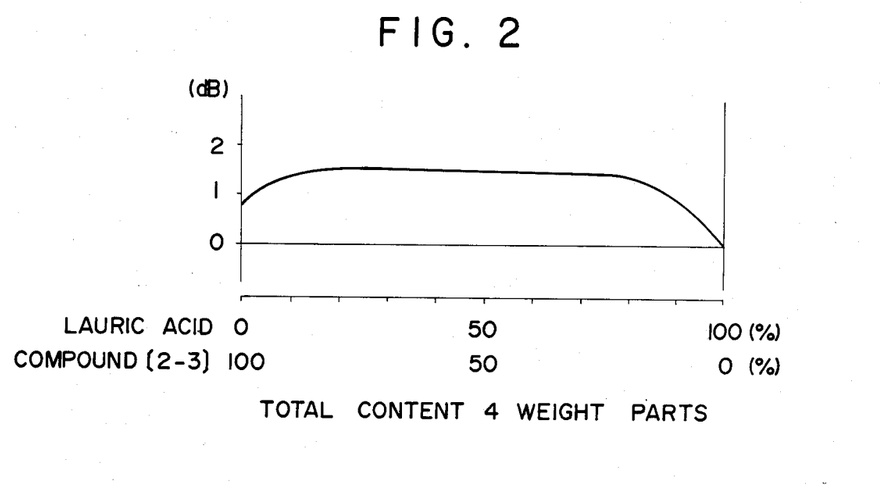
FIG. 2 is a graph showing an example of the characteristic of the saturated output level of the magnetic recording medium of the invention at 10 KHz.

The output levels (M315) at 315 Hz at the distortion ratio of 3% obtained in Examples 3, 5, 6, 7 and 8 and Comparison Examples 2 and 3 are indicated in FIG. 1. The saturated output levels at 10 KHz obtained also in the above are indicated in FIG. 2.

EXAMPLES 23-30

The components indicated below were mixed dispersely for 3 minutes by using a sand grinder having the batch process to yield a paste.

| | |
|---|---|
| Co-coated bertholide iron oxide (Co 3.0 atom % coated FeO$_{1.4}$, Hc:390 Oe, surface area per weight: 32 m$^2$/g) | 100 parts |
| Vinyl chloride/vinyl acetate/maleic acid anhydride copolymer (copolymerization ratio = 86:13:1, degree of polymerization: 400) | 20 parts |
| Polyester polyurethane (molecular weight: about 50,000) | 5 parts |
| Butylstearate | 2 parts |
| Conductive carbon (particle size 10 mµ) | 1 part |
| α-Almina (particle size: 0.4 µm) | 2 parts |
| Methyl ethyl ketone | 150 parts |
| Cyclohexanone | 50 parts |
| Compound number [2-3] | indicated in Table 5 |
| Myristic acid | indicated in Table 5 |

After the above components were dispersely mixed, to the resultant mixture was added 10 parts of Desmodoul L-75 (the product of Sumitomo Bayer Co., Ltd.) and further mixed for 10 minutes and then filtered on a filter having an average pore diameter of 1 µm to yield a magnetic paint.

The magnetic paint was coated on a polyethylene terephthalate film having the thickness of 15 µm (the heat shrinkage ratio is 0.3% and Ra is 0.002 µm after storing at 70° C. for 48 hours), so that the resultant layer after being dried would have the thickness of 5 µm. While the layer was wet, the layer was treated with an electromagnet of 2,000 gauss to give a magnetic orientation. After drying, the magnetic recording layer was subjected to supercalendering in order to make the surface of the layer smooth. The sheet obtained was then slit into a video tape (VHS type) having the width of ½ inch.

Each magnetic recording layer of a video tape prepared in Examples 23 to 26 includes an equal amount of each of myristic acid (referred to as M-A in the following Tables) and the modified silicon compound of Compound number [2-3] having molecular weight of 14336; The total amounts of myristic acid and the modified silicon compound was different in the examples. Each magnetic recording layer of a video tape prepared in Examples 27 to 30 contains myristic acid and the modified silicon compound of Compound number [2-3] in a total amount of 4 parts by weight per 100 parts by weight of the ferromagnetic powder; The ratios of myristic acid and the modified silicon compound in the layer were different in the examples.

The video tapes showed the video outputs, S/N ratios and still characteristics set forth in Table 5.

Also set forth in Table 6 are the jitter and skew under the conditions of: Condition 1: at room temperature, Condition 2: at 40° C. and at 80% RH, Condition 3: after storing 48 hours at 70° C.

COMPARISON EXAMPLES 16-19

Comparison Example 16

A video tape was produced following essentially the same procedure of Example 23 except that the modified silicon compound was not included.

Comparison Example 17

A video tape was produced following essentially the same procedure of Example 23 except that 4 parts by weight of the modified silicon compound of Compound number [2-3] alone was used per 100 parts by weight of the ferromagnetic powder.

Comparison Example 18

A video tape was produced following essentially the same procedure of Exmaple 21 except that myristic acid only was used.

Comparison Example 19

A video tape was produced following essentially the same procedure of Example 21 except that oleic acid only was used.

The video tapes showed the video outputs, S/N ratios and still characteristics set forth in Table 5.

Further set forth in Table 6 are the jitter and skew under the conditions of: Condition 1: at room temperatre, Condition 2: at 40° C. and 80% RH, Condition 3: after storing 48 hours at 70° C.

TABLE 5

| No. | M-A part | [2-3] part | video output (dB) | S/N ratio (dB) | still (minute) |
|---|---|---|---|---|---|
| Example | | | | | |
| 23 | 0.5 | 0.5 | 0.4 | 0.4 | 120 |
| 24 | 1.0 | 1.0 | 0.6 | 0.6 | 120 |
| 25 | 2.0 | 2.0 | 1.9 | 1.8 | 120 |
| 26 | 3.0 | 3.0 | 1.1 | 1.1 | 120 |
| 27 | 0.5 | 3.5 | 0.5 | 0.4 | 120 |
| 28 | 1.0 | 3.0 | 0.8 | 0.8 | 120 |
| 29 | 3.0 | 1.0 | 1.8 | 0.7 | 120 |
| 30 | 3.5 | 0.5 | 0.6 | 0.6 | 120 |
| Comparison Example | | | | | |
| 16 | — | — | −2.5 | −3.6 | 40 |
| 17 | 4.0 | — | 0.2 | −0.1 | 90 |
| 18 | myristic acid | | 0.0 | 0.0 | 90 |
| 19 | oleic acid | | 0.0 | 0.1 | 80 |

TABLE 6

| No. | jitter (µsec) (1) | (2) | (3) | skew (µsec) (1) | (2) | (3) |
|---|---|---|---|---|---|---|
| Example | | | | | | |
| 23 | 0.07 | 0.09 | 0.07 | 12 | 14 | 13 |
| 24 | 0.06 | 0.07 | 0.06 | 9 | 11 | 10 |
| 25 | 0.05 | 0.05 | 0.05 | 6 | 10 | 8 |
| 26 | 0.05 | 0.05 | 0.06 | 7 | 9 | 7 |
| 27 | 0.06 | 0.06 | 0.05 | 8 | 10 | 8 |
| 28 | 0.05 | 0.05 | 0.05 | 8 | 10 | 8 |
| 29 | 0.05 | 0.05 | 0.09 | 8 | 11 | 12 |
| 30 | 0.08 | 0.08 | 0.18 | 8 | 13 | 20 |
| Comparison Example | | | | | | |
| 16 | 0.49 | -not mesurable- | | above 35 | not mesurable | |
| 17 | 0.08 | 0.10 | 0.12 | 10 | 11 | 16 |
| 18 | 0.11 | 0.15 | 0.36 | 15 | 27 | 28 |
| 19 | 0.12 | 0.17 | 0.41 | 16 | 22 | 29 |

Note:
The values listed in Table 5 are relative values based on the video output of Super HG-T-120 (the product of Fuji Photo Film Co., Ltd.) taken as 0dB.

The values for S/N ratio are relative values based on S/N ratio at 10 KHz-4 MHz of Super HG-T-120 (the product of Fuji Photo Film Co., Ltd.), which was obtained upon correcting visual sensitivity, taken as 0 dB.

As for the evaluation of still, the time required at still mode until the screen image was prominently disordered was included.

The above-mentioned video outputs, S/N ratios and still were measured by NV-8750 (the product of Matsushita Electric Co., Ltd.).

Jitter set forth in Table 6 were frequency changes at 15750 Hz measured by Jitter Display (the product of Japan Victor Co., Ltd.) and NV-8750 (the product of Matsushita electric Co., Ltd.).

Skew was measured by TG5-12U (the product of Shiba Den Co., Ltd.) and NV-8750 (Matsushita Electric Co., Ltd.).

Jitter and skew were measured by reproducing an information recorded in the tape kept at 25° C. under the humidity of 60% RH.

EXAMPLES 31–41

A cassette tape was produced following essentially the same procedure of Example 23 except that Co-coated bertholide iron oxide was replaced by an alloy powder containing Fe as a major component (Fe:Ni:Zn=93:5:2, Hc 1,300 Oe, relative surface area: 40 $m^2/g$), myristic acid (2 parts by weight) was used, and the kind and amount of modified silicon compound was changed as follows.

| Example 31: | Compound No. [1-1] | 2 parts |
|---|---|---|
| Example 32: | Compound No. [1-2] | 2 parts |
| Example 33: | Compound No. [2-1] | 2 parts |
| Example 34: | Compound No. [2-2] | 2 parts |
| Example 35: | Compound No. [2-3] | 2 parts |
| Example 36: | Compound No. [2-4] | 2 parts |
| Example 37: | Compound No. [6-1] | 2 parts |
| Example 38: | Compound No. [7-1] | 2 parts |
| Example 39: | Compound No. [19-1] | 2 parts |
| Example 40: | Compound No. [9-2] | 2 parts |
| Example 41: | Compound No. [11-1] | 2 parts |

The video tapes showed the video output, S/N ratios and still characteristics set forth in Table 7.

Further set forth in Table 8 are the jitter and skew under the conditions of: Condition 1: at room temperature, Condition 2: at 40° C. at 80% RH, Condition 3: after storing 48 hours at 70° C.

COMPARISON EXAMPLES 20–23

Comparison Example 20

A video tape was produced following essentially the same procedure of Example 31 except that neither a fatty acid nor a modified compound was used.

Comparison Example 21

A video tape was produced following essentially the same procedure of Example 31 except that 4 parts by weight of the modified silicon compound of Compound number [2-3] only was used.

Comparison Example 22

A video tape was produced following essentially the same procedure of Example 31 except that 4 parts by weight of myristic acid only was used.

Comparison Example 23

A video tape was produced following essentially the same procedure of Example 31 except that 4 parts by weight of oleic acid only was used.

The video tapes showed the video output, S/N ratios and still characteristics set forth in Table 7.

Further set forth in Table 8 are the jitter and skew under the conditions of: Condition 1: at room temperature, Condition 2: at 40° C. at 80% RH, Condition 3: after storing 48 hours at 70° C.

TABLE 7

| No. | video output (dB) | S/N ratio (dB) | still (minute) |
|---|---|---|---|
| Example | | | |
| 31 | 5.4 | 3.5 | 50 |
| 32 | 5.6 | 3.7 | 60 |
| 33 | 5.5 | 3.8 | 50 |
| 34 | 5.6 | 3.9 | 60 |
| 35 | 5.6 | 3.9 | 60 |
| 36 | 5.5 | 3.8 | 60 |
| 37 | 5.3 | 3.7 | 50 |
| 38 | 5.3 | 3.5 | 50 |
| 39 | 5.7 | 3.4 | 50 |
| 40 | 5.6 | 3.5 | 60 |
| 41 | 5.5 | 3.5 | 50 |
| Comparison Example | | | |
| 20 | −0.3 | −2.6 | 2 |
| 21 | 4.1 | 2.8 | 40 |
| 22 | 4.5 | 3.0 | 20 |
| 23 | 5.0 | 2.9 | 10 |

TABLE 8

| | jitter (μsec) | | | skew (μsec) | | |
|---|---|---|---|---|---|---|
| | (1) | (2) | (3) | (1) | (2) | (3) |
| Example | | | | | | |
| 31 | 0.07 | 0.12 | 0.10 | 8 | 14 | 16 |
| 32 | 0.08 | 0.11 | 0.09 | 9 | 13 | 16 |
| 33 | 0.09 | 0.12 | 0.10 | 10 | 13 | 16 |
| 34 | 0.08 | 0.11 | 0.09 | 9 | 13 | 15 |
| 35 | 0.07 | 0.09 | 0.08 | 8 | 12 | 14 |
| 36 | 0.07 | 0.09 | 0.08 | 8 | 11 | 13 |
| 37 | 0.08 | 0.12 | 0.10 | 9 | 13 | 14 |
| 38 | 0.08 | 0.11 | 0.10 | 9 | 12 | 15 |
| 39 | 0.07 | 0.12 | 0.09 | 10 | 14 | 15 |
| 40 | 0.07 | 0.10 | 0.10 | 9 | 12 | 15 |
| 41 | 0.06 | 0.10 | 0.09 | 10 | 11 | 14 |
| Comparison Example | | | | | | |
| 20 | 0.82 | not mesurable | | above 35 | not mesurable | |
| 21 | 0.11 | 0.13 | 0.11 | 12 | 15 | 14 |
| 22 | 0.18 | 0.23 | 0.39 | 20 | 26 | 34 |
| 23 | 0.20 | 0.25 | 0.45 | 21 | 29 | 35 |

Note:
Tests and evalutions were performed in the same manner as the one for Table 5 and 6, and the same representations as in Table 5 and 6 were used.

The video outputs and S/N ratios set forth in Table 5 and Table 7 clearly indicate the improved electromagnetic conversion characteristics of the magnetic recording media of the present invention. Comparison of the examples and comparison examples further evidences that the magnetic recording medium of the present invention containing a fatty acid and a modified silicon compound processes excellent electromagnetic conversion characteristics. Also the long running period at still mode indicates satisfactory durability of the magnetic recording medium according to the present invention.

On the other hand, small values set forth in Table 6 and Table 8 under these conditions (1), (2) and (3) for the jitter and skew of the recording media of the present invention indicate satisfactory running properties under normal conditions, high temperature and high humidity and after storage at a high temperature. Therefore, it has been confirmed that the magnetic recording medium of the present invention is not affected by temperature or humidity and possesses an excellent heat resistance.

We claim:

1. A magnetic recording medium comprising a nonmagnetic support and a magnetic recording layer provided on said support, said magnetic recording layer comprising a ferromagnetic powder dispersed in a binder, which is characterized in that said nonmagnetic support has heat shrinkage ratio of not higher than 1.0% at 110° C. for 4 hours under application of no tension and said magnetic recording layer comprises at least one fatty acid having 12 to 22 carbon atoms and at least one modified silicon compound having a molecular weight of not less than 200, wherein the total amount of said fatty acid and said modified silicon compound in the magnetic recording layer is in the range of 0.5 to 10 parts by weight per 100 parts by weight of the ferromagnetic powder and wherein said magnetic recording layer contains the fatty acid and the modified silicon compound in a weight ratio of 9/1 to 1/9.

2. The magnetic recording medium as claimed in claim 1 in which said modified silicon compound is of the formula 3. The magnetic recording medium as claimed in claim 1, wherein said modified silicon compound has a molecular weight of not less than 1,000.

4. The magnetic recording medium as claimed in claim 1, wherein said modified silicon compound has a molecular weight in the range of 5,000 to 100,000.

5. The magnetic recording medium as claimed in claim 1, wherein said modified silicon compound is a fatty acid-modified silicon compound.

6. The magnetic recording medium as claimed in claim 5, wherein said fatty acid-modified silicon compound is a silicon compound modified with a fatty acid having 12 to 22 carbon atoms.

7. The magnetic recording medium as claimed in claim 1, wherein said magnetic recording layer contains the fatty acid and the modified silicon compound in a weight ratio of 7/3 to 3/7.

8. The magnetic recording medium as claimed in claim 7 in which the total amount of said fatty acid and said modified silicon compound in the magnetic recording layer is in the range of 1 to 5 parts by weight per 100 parts by weight of the ferromagnetic powder.

9. The magnetic recording medium as claimed in claim 1 in which said non-magnetic support has a heat shrinkage ratio of not higher than 0.7%.

10. The magnetic recording medium as claimed in claim 1 in which said fatty acid is selected from the group consisting of lauric, myristic, stearic and oleic acids.

11. The magnetic recording medium as claimed in claim 10 in which said modified silicon compound is of the formula or wherein n is 1 or 11.

12. The magnetic recording medium as claimed in claim 10 in which said modified silicon compound is of the formula or

-continued in which R, $R^1$ and $R^2$ are a hydrocarbon of 7 to 21 carbon atoms, $R^3$, $R^4$, $R^5$ and $R^6$ are a hydrocarbon of 1 to 21 carbon atoms, m is an integer of 1 to 100, n is an integer of 0 to 250, m+n is less than or equal to 300 and m is greater than or equal to n/5; and x, y and z have the relationship of $1 \leqq z < 150$, $0 \leqq y$, $y + z \leqq 1,000$, $1 \leqq x < y + z$, and $z/y = 1/1000 - 1/1$; and b is an integer from 0 to 1,000.

13. The magnetic recording medium as claimed in claim 12 in which said modified silicon compound is of the formula or wherein m and n are respectively 1 and 1, 10 and 20 or 100 and 200, and wherein z and y are respectively 1 and 1 or 25 and 75.

14. The magnetic recording medium as claimed in claim 12 in which said modified silicon compound is of the formula